May 25, 1965 I. B. MARGILOFF 3,185,964

DATA SYSTEMS

Filed April 2, 1962 3 Sheets-Sheet 1

INVENTOR.
IRWIN B. MARGILOFF
BY

ATTORNEYS

INVENTOR.
IRWIN B. MARGILOFF
BY

ATTORNEYS

May 25, 1965 I. B. MARGILOFF 3,185,964

DATA SYSTEMS

Filed April 2, 1962 3 Sheets-Sheet 3

INVENTOR.
IRWIN B. MARGILOFF

United States Patent Office 3,185,964
Patented May 25, 1965

3,185,964
DATA SYSTEMS

Irwin B. Margiloff, 201 E. 19th St., New York, N.Y.
Filed Apr. 2, 1962, Ser. No. 184,207
23 Claims. (Cl. 340—172.5)

This invention relates to the storage and retrieval of digital information, and more particularly relates to improvements in electronic systems and in information storage units providing increased storage capacity, which can be conveniently used to catalogue large accumulations of information.

In the storage for future reference of large amounts of information contained in individual works, such as in books, magazine articles or patents, this information is frequently stored in an arbitrary or chronological sequence, although it is usually necessary to retrieve the information according to subject matter. For instance, information contained in the patents owned by a large corporation is catalogued chronologically according to an arbitrary number system, or alphabetically according to the inventor's name, or broadly according to a rather general subject-matter classification, but in most retrieval situations it is necessary to recover portions of the information which relate to certain very specific subjects or combinations of subjects. Another example is to retrieve coded data when certain items of information are known which can be presented to the system, for instance, the retrieval in another language of a word having the same meaning as a word presented to the system.

Conventional storage means utilizing mechanical moving components are well known, but the limitations on these systems are quite severe and seriously hamper the functioning of the systems by requiring unduly large retrieval time for mechanically processing punched cards and other similar storage units. Magnetic recording media such as tape and wire are relatively cumbersome to handle and have relatively long access times, occasioned principally by the necessity of always starting at the beginning of the tape in order to find data which is stored at a point further along. Magnetic discs and drums have shorter access times, but present more difficult physical handling and manipulation problems.

It is a principal object of this invention to provide improved data storage and retrieval systems employing digitally encoded electrical storage units which store information both according to the position of the data on the unit, for example rows or columns, and also according to tuned electronic elements which form frequency sensitive circuits, part of each complete tuned circuit being located on the data storage card itself, and the other part being located externally of the card and comprising a part of the encoding and decoding electronics of the system itself.

It is another major object of this invention to provide improved data storage units having frequency-sensitive circuit elements arranged in plural separate paths, each of said elements having a reactance value which is easily preadjusted by making relatively simple changes in the storage unit, which changes can be made either by hand, or can be accomplished at a higher rate by the use of relatively simple machinery which could be designed to operate like an electric typewriter to print circuits or to sever printed circuits on the units.

Another important object of this invention is to provide a system having substantially no moving parts, with the exception of the storage-unit switching means required to effect progressive scanning of different storage units by the system, which system has a very large storage capability, although the storage units themselves are of very simple structure and can be very inexpensively manufactured on a mass production basis. It is, therefore, the object of this invention to provide a storage system in which the coding of the information may be mechanically accomplished in a novel and simple manner.

Yet another object of the invention is to provide a system of coding and decoding which cooperates with relatively simple apparatus serving to encode and present signals representing the queries to be searched, and including relatively simple query signal generating means having a very large capacity inherent in a system of only moderate electronic complexity, and the present system also having relatively simple means for indicating successful searching.

Still a further object of the present invention is to provide a system cooperating with data storage units each having two kinds of information, one area of each unit storing coded information which is itself to be retrieved, and another area of the unit storing information which uniquely identifies that particular storage unit, or else identifies the source of the complete information stored and represented by the unit, for instance a particular book or scientific publication, such as a patent.

Other objects and advantages of the information will become apparent during the following discussion of the drawings, wherein.

Figure 1:
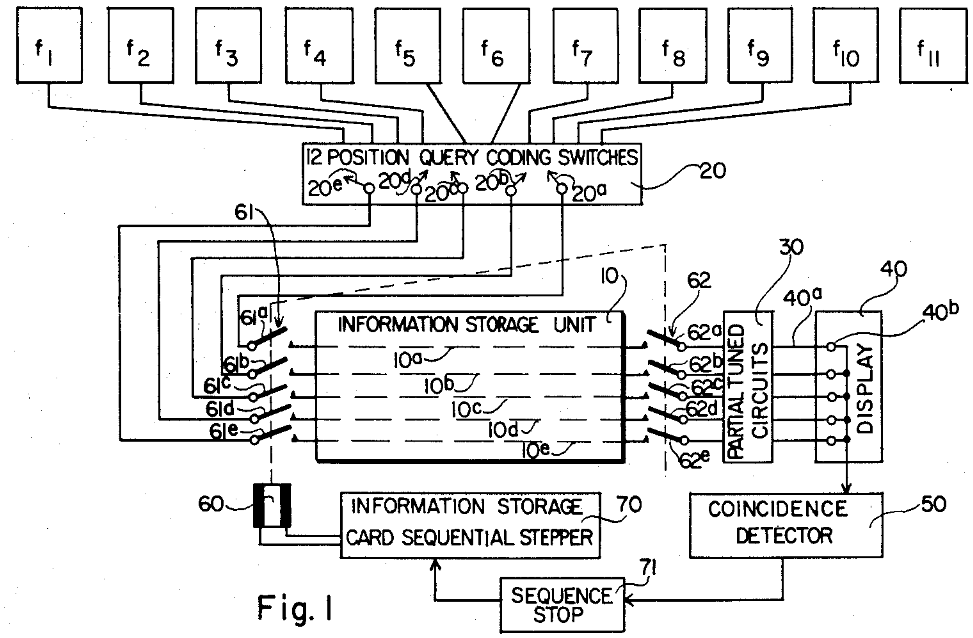
FIG. 1 is a block diagram of an embodiment of a system according to the present invention and showing a query signal generating means, a single data storage unit connected therewith by appropriate switching, and also showing readout decoding means operating a display representing successful researching.
Figure 10:
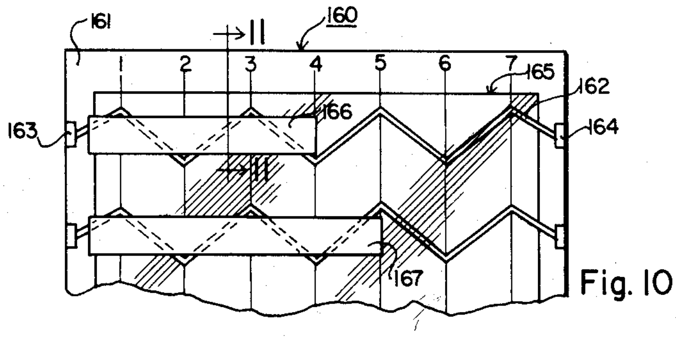
FIG. 10 is a partial elevation view of a different type of information storage unit containing inductive instead of capacitive storage means.

Referring now to the drawings, FIG. 1 shows a system including a query signal generating means comprising a plurality of oscillators *f*1 through *f*11, inclusive, connected through a set of coding switches 20 with a storage unit 10 which is coupled at its output side to a readout means comprising a plurality of frequency-sensitive circuits 30 and a display means 40 connected with a coincidence detector 50. Actually, although the diagram of FIG. 10 shows only a single information storage unit 10, it is to be understood that the system will accommodate and search a very large number of such units and that each unit is connected, in sequence, with the query signal generating means at its input end and with read-out means at its output end by appropriate switching operated by electrical actuator means schematically represented by the solenoid 60 connected to operate input switches 61 including 61*a*, 61*b*, 61*c*, 61*d* and 61*e* and to operate output switches 62 including the switches 62*a*, 62*b*, 62*c*, 62*d* and 62*e*, these input and output switches being mechanically ganged. Some means is necessary to actuate the solenoid winding 60 for controlling the switches 61 and 62, and this is provided by a sequential stepper relay 70 of any conventional type which continuously steps the storage units 10 one by one into contact with the input and output circuits of the rest of the system and which automatically performs sequential stepping until it is stopped by a stop means 71 which can conveniently comprise a relay actuated by the coincidence detector 50 when coincidence is attained in all of the horizontal paths 10*a*, 10*b*, 10*c*, 10*d* and 10*e* of the information storage unit 10.

Figure 2:
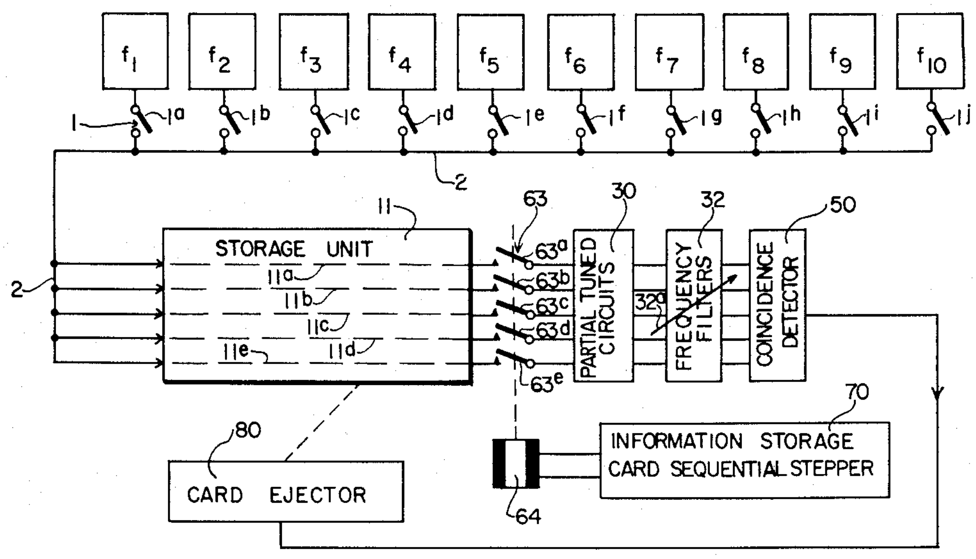
FIG. 2 is a block diagram of a system similar to the system of FIG. 1, but modified somewhat to provide a different and simpler system.

The system illustrated in the block diagram of FIG. 2 is similar to the system of FIG. 1 in general overall character, but is different in certain specific respects. The system of FIG. 2 includes as its query signal generating means a plurality of separate oscillators, in this example ten of them, which are labeled *f*1 through *f*10, inclusive. These oscillators, however, are not connected through individual selective switches as in the case of switches 20 in FIG. 1, but are all connected in parallel so that their outputs all appear on a single common busbar 2 which can be selectively connected with a desired combination of oscillators *f*1–*f*10 through a row of switches 1 including specifically the switches 1*a*, 1*b*, 1*c*, 1*d*, 1*e*, 1*f*, 1*g*, 1*h*, 1*i* and 1*j*. This is a simpler system than the system shown in FIG. 1, and is at the same time capable of storing somewhat less information, as will appear during a subsequent more complete discussion of the figures.

The inputs from the busbar 2 are connected with all of the paths through the information storage unit 11, which paths include the rows 11*a*, 11*b*, 11*c*, 11*d* and 11*e*. The outputs are, however, individually connected by switches 63 including the switches 63*a*, 63*b*, 63*c*, 63*d* and 63*e*, all of which are ganged together and operated by a single solenoid actuator 64 which is sequentially stepped along by the sequential stepper 70 which can be the same as in FIG. 1. However, the outputs from the information storage unit 11 first pass through complementary partial tuned circuits 30 and then through individually adjustable frequency filtering circuits 32, the outputs of which are connected with a coincidence detector 50 which controls a storage card ejector 80 serving to eject cards which register coincidence with all of the information entered into the system by way of the query oscillators *f*1 through *f*10, inclusive, the details of the mechanical ejector forming no part of the present invention.

There are three general types of information storage units which are of particular utility in connection with the present system, each of the information storage units comprising a plurality of paths and these paths differing from one type to another to the extent that in the simplest case the path can simply constitute a continuity path which when continuous provides a binary "one" or which when broken provides a binary "zero." In the more sophisticated second form, each path can comprise a capacitor which forms a part of a tuned circuit the other part of which is conveniently located externally of the information storage unit, and comprises part of the read-out system. The third form of information storage unit comprises a card having an inductance printed thereon in each path, and these inductances being adjustable and comprising part of a tuned circuit, the capacitive portion of which is located externally of the information storage unit and comprises part of the read-out system. These cards will be discussed in greater detail in connection with FIGS. 5, 6, 7, 8 and 9 which show capacitive storage paths, and in connection with FIGS. 10, 11, 12 and 13 which show inductive storage paths. It is also to be understood that continuity paths and the inductive and capacitive paths can be mixed on a card so as to provied additional variable combinations or permutations. This type of storage card provides a very useful way of identifying plural different information registers of the system in which various storage cards are located since the inductive path will look electrically continuous to applied direct-current signals, and since rows of storage paths having capacitive elements will look like open circuits to direct-current applied thereto, these differences being used to provide further information variables.

Referring now to a more detailed discussion of FIG. 1, the system includes a very large number of information storage cards 10 each having an arbitrarily selected number of rows of electrical elements, such as the illustrated five rows 10*a* through 10*e*. The card is connected in and out of the system by the solenoid 60 actuating the input and output switches 61 and 62. In this example, five rows are used in the information storage unit, and each of the rows is connected at its input end by the switch 61 with a different one of a corresponding number of switches in the query coding switch unit 20 including the switches 20*a*, 20*b*, 20*c*, 20*d* and 20*e*. Also, in the present example there are eleven different oscillators *f*1 through *f*11, and therefore twelve switch positions are required in the coding switches so that any one of the switches in the unit 20 can select any one of the frequencies *f*1 through *f*11, or in a twelfth position can select no input, thereby adding another variable to provide a duodecimal system. Suppose, for example, that a query signal is provided whereby the frequency *f*3 is passed through the row 10*a* of the information storage unit 10, in other words the switch 20*a* is set to deliver frequency from the oscillator *f*3. Assuming that the information storage unit has a path therethrough comprising either an inductance or a capacity, this path 10*a* within the storage unit 10 can be made series resonant in a manner well known per se by a complementary capacity or inductance, as the case may be, located in the partial tuned circuit unit 30 and comprising part of the read-out of the system. In other words, if the path 10*a* comprises a capacity and an associated path within the partial tuned circuit 30 comprises an inductive path, and these two paths when coupled together by the switch 62*a* comprise a composite resonant circuit at the frequency *f*3, then a signal will be delivered at the output 40*a*, and a display, such as a glow lamp 40*b*, will be illuminated inducting continuity in the path 10*a* of the storage unit at the frequency of the oscillator *f*3. On the other hand, if the capacity path 10*a* and the inductance in the tuned circuit unit 30 are not resonant at the frequency *f*3, the glow lamp 40*b* will not be illuminated, and no continuity at that frequency will be displayed at that path. Similarly, if the switches 20*b*, 20*c*, 20*d* and 20*e* are all connected with oscillators so as to present frequencies in the paths 10*b* through 10*e*, respectively, at which these paths are resonant when taken with complementary reactances in the partial tuned circuit unit 30, then all of the glow lamps in the display unit 40 will light simultaneously, indicating that successful searching has been accomplished and that the paths in this storage unit 10 are each resonant at the particular frequency applied thereto. A coincidence detector using a single glow lamp will be hereinafter described in connection with the circuit shown in FIG. 4. When coincidence occurs, the coincidence detector 50 is triggered, issues a stop command to the relay unit 71 which halts the searching by stopping the sequential stepper 70 at the particular card meeting all of the path requirements for coincidence. This kind of read-out is, of course, only one possible read-out and is not intended to limit the invention to a system which stops when a storage unit meeting all of the requirements for coincidence is found.

In FIG. 2, a somewhat different operation is provided by selectively closing a plurality of switches so as to place plural different frequencies on the busbar 2, all of which frequencies are presented to the paths 11*a* through 11*e* of the storage unit 11. The output from this storage unit and the character of the storage unit itself can be exactly the same as in FIG. 1, for instance comprising partial tuned circuits in the storage unit 11 cooperating with partial tuned circuits in the tuned circuit unit 32, and the outputs from these partial tuned circuits, when connected together to form composite resonant paths, then operating a plurality of frequency pass filters which are respectively tuned to the selected ones of the frequencies of the ten oscillators *f*1 through *f*10. In other words, this type of system, though providing common inputs to all of the storage units 11, requires certain frequencies at the outputs of certain paths 11*a* through 11*e* in order to correspond with the frequencies pre-selected at the individual filter 32. These filters are schematically indicated by the arrows 32*a* as being manually adjustable in each path to select a different frequency from one of the oscillators *f*1 through *f*10. However, the partial tuned circuits inside the fixed unit 30 may comprise in each path the same inductance value or the same capacity value as in all of the other external paths, in which case the variable elements of the tuned circuits are all provided in the storage units, although, as stated above, the paths may include a mixture of inductive and capacitive elements within the various paths of the tuned circuit unit 30 as well as in the various paths of the storage unit 11. For the sake of showing a modified system within the invention, FIG. 2 includes a card ejector which serves to eject those storage units which are found to meet the requirements for coincidence by the coincidence detector 50. There are many other types of read-out and display means which can be used with the present data processing system according to the invention, and which means can also include recording means, for example of the type disclosed in my copending application Serial Number 54,879, filed September 9, 1960.

Figure 3:
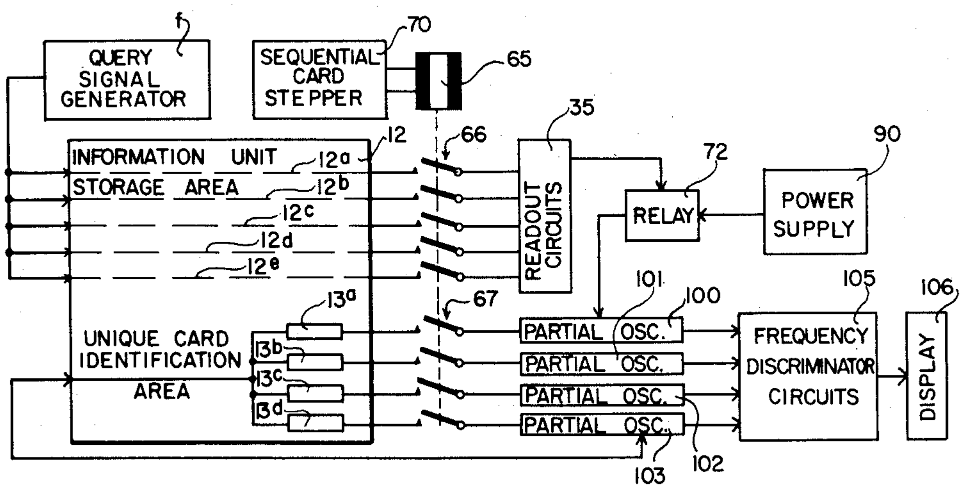
FIG. 3 is a block diagram of a still further modified system for use with information storage units having two separate areas in which the information to be searched is stored in one area and the other area has storage-unit identification means for uniquely identifying the particular storage unit.

Referring now to FIG. 3, a modified type of storage unit 12 is illustrated having five information paths in its data storage area labeled 12*a* through 12*e*, inclusive, and having unique card identification means in its lower storage area by which the particular data storage card can be identified. A query signal generator *f* is used comprising a plurality of oscillators and coding switches as shown in FIG. 1, or alternatively as in FIG. 2, for feeding a query into the upper information storage paths 12*a* through 12*e*. The outputs of these storage areas are sequentially connected by a switching actuator having a solenoid winding 65 and operated by a sequential card stepper 70, the actuator 65 including a plurality of switches 66 having five upper switches for connecting the paths 12*a* through 12*e* to a read-out circuit generally designated by the reference character 35 and including tuned circuit elements and a coincidence detector in a system of the type shown either in FIG. 1 or in FIG. 2. These read-out circuits operate a relay 72 which is closed upon the occurrence of coincidence through all of the information storage paths 12*a* through 12*e*, the relay connecting power from a power supply 90 to a plurality of partial oscillator circuits 100, 101, 102 and 103 in the example illustrated. These oscillator circuits 100 through 103 are "partial" because of the fact that part of the tuned circuit of each is located in one of the paths 13*a*, 13*b*, 13*c* and 13*d* in the card-identification area of the information storage unit 12. Thus, when the partial oscillators are connected with the circuit elements in the card-identification area of the information storage unit 12 by the switches 67, these oscillators, if energized by power from the power supply 90 through the relay 72 oscillate, each at a particular frequency, and these frequencies are then delivered to frequency discriminator circuits generally referred to by the reference character 105 which then operate a display means 106, for indicating which card is connected at that particular moment by indicating which four of plural possible oscillator output frequencies is present. However, the relay 72 is closed only if coincidence is found by the read-out circuits 35, and therefore the partial oscillators are energized from the power supply only by those cards which have established coincidence in all the paths 12*a* through 12*e*, inclusive. A very large number of different frequencies can be generated by the partial oscillators 100–103, inclusive, depending upon the particular coincidence values established in the unique card-identification area in the paths 13*a* through 13*d*, and a simple system of tuned circuits and glow tubes can be used to indicate which frequencies are being generated.

One path, for instance path 13*a*, could establish which one of a plurality of registers the information storage card is located in, and the other three paths 13*b*–13*d* could be used to establish particular locations within that register for the card providing coincidence in the information storage paths 12*a*–12*e*.

This type of read-out is different from that provided in FIGS. 1 and 2 in which the card experiencing coincidence is mechanically indicated as to its position, whereas in the unit shown in FIG. 3 the position of the card can be electrically defined for example by glow tubes arranged on a matrix board which can be read, or photographed, in a manner which need not be considered in detail in the present invention. For present purposes, it is enough to establish the identification of the card by establishing a combination or permutation of different frequencies peculiar to that particular card.

Figure 4:
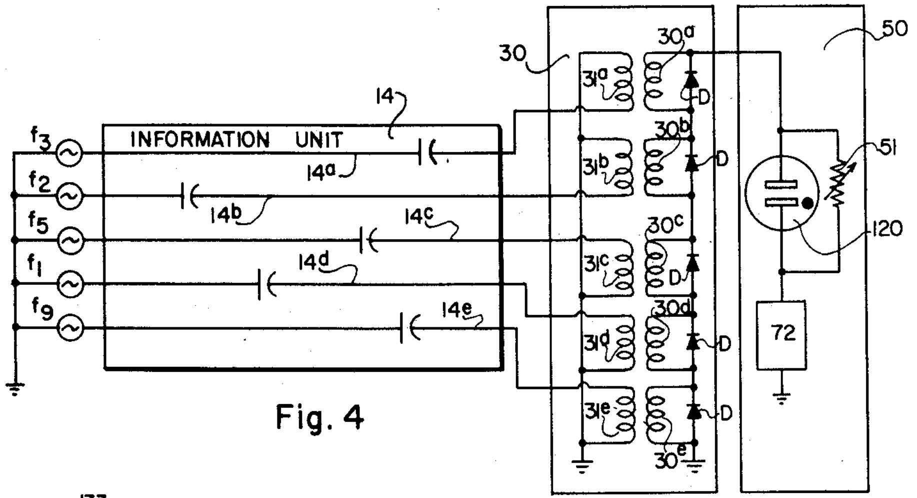
FIG. 4 is a schematic diagram illustrating by specific embodiment a capacitive storage unit cooperating with inductive partial tuned circuits and with a coincidence detector suitable for use in connection with the systems illustrated in FIGS. 1, 2 and 3.

Referring now to FIG. 4, this figure shows a simple type of coincidence detector in which a glow tube 120 is provided in a circuit which is connected in series with a plurality of secondary windings 30*a*, 30*b*, 30*c*, 30*d* and 30*e* across diodes D which deliver an additive D.C. potential to the glow tube. The storage unit card 14 is illustrated only schematically and is shown as having five capacitive paths 14*a* through 14*e*. The coincidence detector glow tube 120 receives a high enough voltage from the secondary windings and diodes D to cause it to glow only if resonance is established through all of the capacitive paths taken with their complementary primary inductances 31*a* through 31*c*. Therefore, if one of the paths is non-resonant, coincidence will not be indicated by the glow tube 120 because the voltage thereacross will be too low to break it down. In this circuit, oscillators *f*3, *f*2, *f*5, *f*1 and *f*9 are shown as connected with the respective paths of the information unit 14, and if all paths are resonant, the gas-filled glow tube will conduct, and can be used to operate the relay 72 by connecting the winding thereof in series with the glow tube 120 in unit 50. This circuit provides convenient means by which the number of limitations on the query signal can be varied. Suppose that a certain combination of oscillators *f*1 through *f*11, in FIG. 1, is selected but that after all of the information storage units 14 have been searched, no card is found which experiences coincidence in all paths. If the information were arranged on the cards so that the most important items were in the uppermost paths and items of decreasing importance appeared in the lower paths, then adjustments could be made in the coincident detector calibrating resistance 51 of FIG. 4 whereby on a subsequent search of the storage units coincidence would be indicated if the first four paths 14*a*, 14*b*, 14*c* and 14*d* were resonant, regardless of whether the path 14*e* experienced resonance. If another search is made with only four requirements in order to establish coincidence, and still no storage unit was searched having these characteristics, then the path 14*d* could be dropped by switching off the oscillator *f*, corresponding therewith and readjusting the resistor 51 and a further search instituted for storage units having coincidence in only the first three rows. In this manner, successive searches can be run until the group of cards having the best information available has been found.

FIGS. 5 through 13 show specific examples of information storage cards having capacitive and inductive elements in their respective rows. For the sake of simplicity, cards having only five or less rows have been illustrated, although it is to be understood that greater numbers of rows can easily be used in systems requiring storage and retrieval of very great amounts of information.

Figure 5:
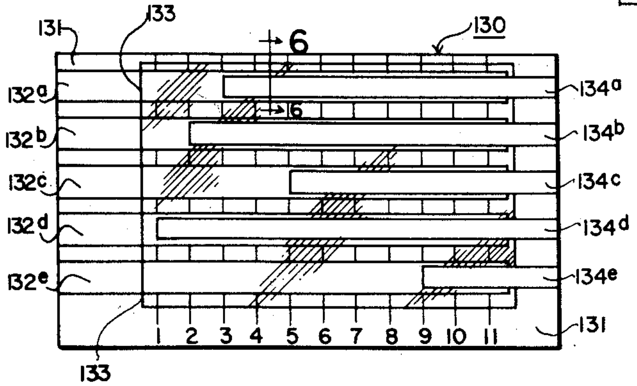
FIG. 5 is a plan view of a capacitive information storage unit according to the present invention.
Figure 6:
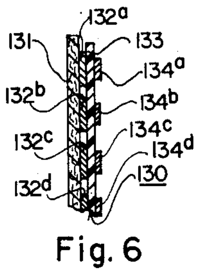
FIG. 6 is an enlarged sectional view taken along line 6—6 of FIG. 5.

Referring specifically to the structure of the storage unit 130 shown in FIGS. 5 and 6, this unit comprises a card 131 of insulating material such as paper and having a plurality of strips of foil 132*a*, 132*b*, 132*c*, 132*d* and 132*e* affixed thereto in spaced relation. Over all of these strips is applied a dielectric insulation 133, a sheet or a coating, forming the dielectric of five capacitors, one side of which is established by the foil strips 132*a* through 132*e* and the other side of which is established by other foil strips 134*a*, 134*b*, 134*c*, 134*d* and 134*e*. Note that the strips 132 do not extend all the way to the right side of the card 131 but that they do extend all the way to the left side of this card and therefore can be used as input contacts for the left side of the card. Likewise, the foil strips 134 extend all the way to the right side of the card and can therefore be used as output contacts for the card. Across the bottom of the card is a row of numbers 1 through 11 indexed with vertical lines which establish a visual grid that divides the overlap of the foil strips 134 with the foil strips 132 into eleven equal increments. The amount of capacity therefore that is established between the strip 132*a* and the strip 134*a* can be selectively varied to equal one of eleven different values by tearing off the strip 134*a* at the proper grid line location. The five different strips 134*a* through 134*e* shown in FIG. 6 have been torn off at different locations so that they are coded with the number 32519 and since it is possible to tear the strip off altogether, there are really twelve different positions by which each strip 134 can overlap a strip 132*a* so that this card provides a five-digit numeral based on a duodecimal numerical system. FIG. 6 shows an exaggerated cross section for the purpose of illustrating the manner in which this card is constructed.

Figure 7:
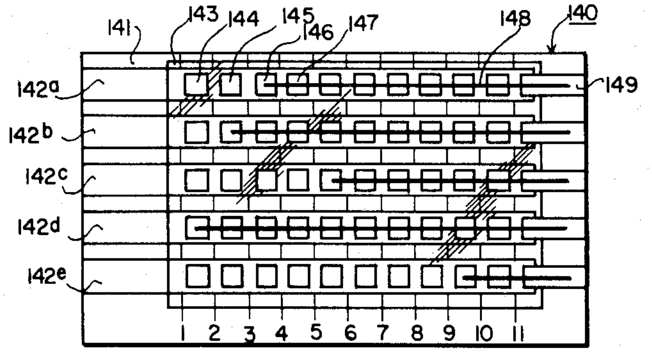
FIG. 7 is a plan view of a capacitive information storage unit of a type similar to that shown in FIG. 5 but modified in certain specific respects.

The structure of the card 140 shown in FIG. 7 is very similar to that of the card 130 shown in FIG. 5 to the extent that it includes a paper card 141 having five foil strips 142*a* through 142*e*, inclusive, and also includes a dielectric insulation 143 overlying all of these strips, which insulation forms the dielectric of a series of capacitors including upper plates comprising a plurality of little foil squares such as the squares 144, 145, 146, 147, etc., bonded to the dielectric plastic sheet 143. In this particular embodiment of this invention, a conductive ink or paint 148 is used to join a certain number of these little foil squares such as the squares 146 and 147, and intervening squares of the row, with the foil 149 at the extreme right end of the card which forms the output terminal thereof. The number of little foil squares joined in each row establishes the code for which the card is set up, and it will be noted that this card bears the same code as the card shown in FIG. 6, namely the number 32519 of a duodecimal numerical system. This card has certain advantages over the card shown in FIG. 6 because of the fact that the capacities for the different positions could probably be more easily established during manual coding of the card than would be possible if it were necessary to tear off foil strips as in the case of the card of FIG. 5. Note, however, that a relatively simple machine could be devised which would be operated by a keyboard and which would apply foil strips of the correct length to a card of the type shown in FIG. 5, rather than tear off foil strips that were already applied thereto. Thus, there would be five rows of keys on the machine, and when the number three key was pressed in a first row, the machine would apply a foil strip to the top row of the card ending in the third position, as shown in FIG. 5.

Figure 8:
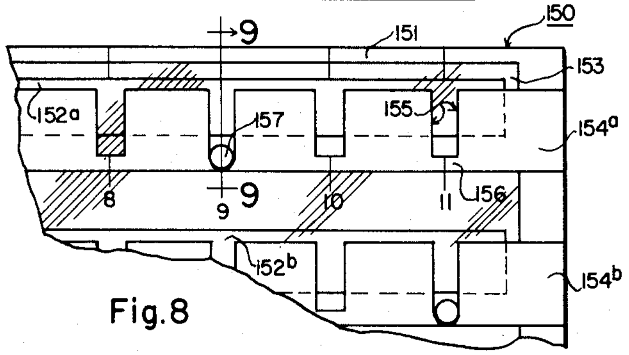
FIG. 8 is a partial plan view of a capacitive information storage unit which comprises still a further modification within the invention.
Figure 9:
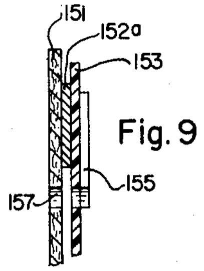
FIG. 9 is a sectional view taken along line 9—9 of FIG. 8.

Another modified structure permitting greater ease of adjustment of the code on a card is illustrated in FIGS. 8 and 9 in which the storage unit 150 comprises a paper card 151 having strips 152*a*, 152*b*, etc. applied to the card in a manner similar to the strips applied in FIGS. 5 and 7. These strips are likewise covered by a dielectric sheet 153, and then addiitonal foil strips 154*a*, 154*b*, etc. are applied over the dielectric sheet 153. However, in this case the foil strips 154 have notches 155 cut thereinto which leave a narrow web 156 at regular intervals. When the card is manufactured in this manner, it is manufactured with the code 11111, and this code is then changed by punching out the narrow web 156, for instance in the position shown at 157, which punching out can be easily accomplished by an ordinary paper punch. In this manner, only the capacity appearing to the right of the punch marked 157 is included in the tuned circuit of that path.

The structure shown in FIGS. 10, 11, 12 and 13 represent a different approach to the tuned storage unit paths in which a variable inductance is provided rather than a variable capacity. This variable inductance is rather easily provided by zigzag printed circuits which are adjustable in a manner to be hereinafter described.

Figure 11:
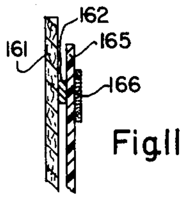
FIG. 11 is a sectional view taken along line 11—11 of FIG. 10.

Referring now to the embodiment shown in FIGS. 10 and 11, this storage unit 160 comprises a card 161 of insulating material having a zigzag inductance 162 printer thereon either by conductive ink or by the application of foil, or by some other suitable means. This inductance is connected at both ends, for instance by an input terminal 163 and an output terminal 164, and over the inductive zigzag a dielectric sheet 165 is applied as shown in an exaggerated manner in FIG. 11. A plurality of these zigzags are provided, and over them is printed or otherwise applied a powdered or sheet core material 166 which increases the inductance. For instance, in FIG. 11 the upper side is coded at the numeral 4, and the next lower zigzag is coded at the numeral 5. Obviously, more than two rows of zigzags can be provided, and in addition the core material 166 which has the effect of increasing the inductance could be replaced with a metal foil such as the foil 167 which have a capacitive shortcircuiting effect on the inductance to thereby reduce its value. In either case, the inductance illustrated in FIG. 10 in each row can be varied and is to be coupled with a complementary capacitive reactance in the read-out circuit located externally of the information storage unit 160.

Figure 12:
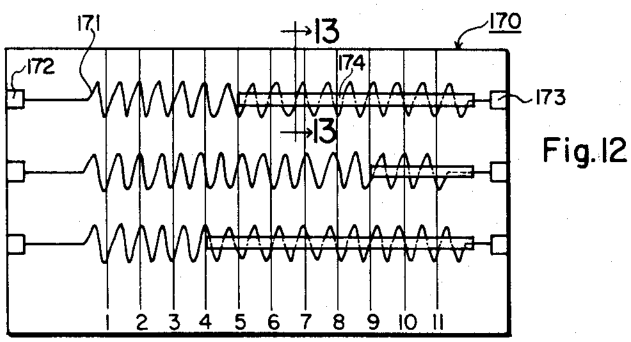
FIG. 12 is a plan view of still another type of inductive storage element on an information storage unit.
Figure 13:
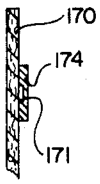
FIG. 13 is an enlarged sectional view taken along line 13—13 of FIG. 12.

Still another modification of an inductance-type information storage card is shown in FIGS. 12 and 13 wherein a card 170 of insulating material is provided with a printed conductive zagzag 171 connected at its input end to a terminal 172 and at its output end to a terminal 173. In this embodiment no dielectric layer is used, and the amount of inductance in each row is simply decreased by the application of a strip or a conductive paint or ink 174 drawn over and shortcircuiting the printed inductance so as to reduce the number of turns thereof. The card shown for illustrative purposes in FIG. 12 is coded, reading from top to bottom, 594, but it is to be understood that a great many more rows of printed inductances could be employed in order to provide a card having a larger storage capacity. Moreover, by extending the conductive strips 174 all the way across the card, paths based on simple conductivity can be provided.

In addition to the use of individual paths through the information storage unit cards each of which has a considerable range as to its total capacity or inductance, and in addition to the fact that some of the paths on a single card could be inductive and others capacitive on the same card, it is also contemplated that the various paths on each card can be connected in series-parallel combinations so as to provide an overall characteristic which is the composite of several individual characteristics coupled together.

It has thus been demonstrated that by using plural frequencies in systems of the type set forth in the present structure a tremendous increase in storage capability can be obtained as compared with simple binary storage techniques, and, in the present system, the additional complication involved is small in comparison with the additional utility provided by the use of frequencies in combination with positional code storage.

I do not limit my invention to the exact forms shown in the drawings, for obviously changes may be made therein within the scope of the following claims.

I claim:

1. A data storage and retrieval system comprising a plurality of data storage units each having plural signal paths and at least some of the paths including reactance circuit elements; query signal generating means for delivering plural selected oscillation frequencies; partial tuned circuit means including plural paths at least some of which include reactances; switch means for coupling said query signal generating means with the paths of said partial tuned circuit means via corresponding paths of successive data storage units; and coincidence detector means coupled with the paths of said partial tuned circuit means for detecting simultaneous conduction through plural paths of a storage unit when the reactive paths are tuned by their circuit elements coupled with said reactance to said selected oscillation frequencies.

2. In a system as set forth in claim 1, said query signal generating means comprising oscillators for generating a greater number of frequencies than there are signal paths and switches for selecting some of said frequencies for delivery to said signal paths.

3. In a system as set forth in claim 1, the reactive paths of the storage unit being complementary to the reactances of the partial tuned circuits to form composite paths resonant at various frequencies from the query generating means, and said coincidence detector means detecting resonance in all of the paths at the respective frequencies being passed therethrough.

4. In a system as set forth in claim 3, said coincidence detector means comprising gas-filled glow tube means illuminated by current derived from the passage of said frequencies through said paths when resonant.

5. In a system as set forth in claim 1, said storage units having zones of insulating material on at least one face, and said reactance in the paths of the storage units comprising conducting strips applied to said insulating zones of the units and adjustable by varying the areas and positions of the strips thereon.

6. A data storage and retrieval system comprising a plurality of data storage units each having plural signal paths including reactance circuit elements; query signal generating means for generating a greater number of oscillation frequencies than the number of paths and for delivering plural selected frequencies; a separate coding switch connected with each path for coupling one frequency to said path; partial tuned circuit means having plural paths including reactances; switch means for coupling said coding switches with the paths of said partial tuned circuit means via corresponding paths of successive data storage units; and coincidence detector means coupled with the paths of said partial tuned circuit means for detecting simultaneous conduction through paths of a storage unit when the paths are tuned by their reactance circuit elements coupled with said reactances to said selected oscillation frequencies.

7. In a system as set forth in claim 6, the reactive paths of the storage unit being complementary to the reactances of the partial tuned circuits to form composite paths resonant at various frequencies from the query generating means, and said coincidence detector means detecting resonance in all of the paths at the respective frequencies being passed therethrough.

8. In a system as set forth in claim 7, said coincidence detector means comprising gas-filled glow tube means illuminated by current derived from the passage of said frequencies through said paths when resonant.

9. In a system as set forth in claim 6, said storage units having zones of insulating material on at least one face, and said reactance in the paths of the storage units comprising conductive strips applied to said insulating zones of the units and adjustable by varying the areas and positions of the strips thereon.

10. A data storage and retrieval system comprising a plurality of data storage units each having plural signal paths including reactance circuit elements; query signal generating means for generating a greater number of oscillation frequencies than the number of paths and for delivering plural selected frequencies; partial tuned circuit mans having plural paths including reactances; switch means for coupling said query signal generating means with the paths of said partial tuned circuit means via corresponding paths of successive data storage units; an adjustable frequency filter coupled with each path of the partial tuned circuit means and tuned to one of said selected frequencies; and coincidence detector means coupled with the filters for detecting simultaneous conduction through all of the paths when the reactive circuit elements coupled with said reactances are tuned to the respective oscillation frequencies to which the filters in the paths are tuned.

11. In a system as set forth in claim 10, the reactive paths of the storage unit being complementary to the reactances of the partial tuned circuits to form composite paths resonant at various frequencies from the query generating means, and said coincidence detector means detecting resonance in all of the paths at the respective frequencies being passed therethrough.

12. In a system as set forth in claim 11, said coincidence detector means comprising gas-filled glow tube means illuminated by current derived from the passage of said frequencies through said paths when resonant.

13. In a system as set forth in claim 10, said storage units having zones of insulating material on at least one face, and said reactance in the paths of the storage units comprising conductive strips applied to said insulating zones of the units and adjustable by varying the areas and positions of the strips thereon.

14. A data storage and retriever system comprising a plurality of data storage units each having plural signal paths and plural identification paths and at least some of the paths including reactance circuit elements; query signal generating means for delivering query signals to said signal paths; readout circuit means for determining when query signals are passed by all signal paths; a plurality of partial oscillator circuits; switch means for coupling said query signal generating means and said read-out means with said signal paths of successive data storage units and for coupling the identification paths with different partial oscillator circuits to complete each such circuit; frequency discriminator means coupled with said partial oscillator circuits for determining which frequencies are generated thereby to identify the storage unit coupled by the switching means; and control means controlled by the read-out means when query signals are passed by all signal paths thereby to energize the partial oscillator circuits to generate identifying frequencies determined by reactance elements in said identification paths.

15. In a system as set forth in claim 14, said storage units having zones of insulating material on at least one face, and said reactance in the paths of the storage units comprising conductive strips applied to said insulating zones of the units and adjustable by varying the areas and positions of the strips thereon.

16. A digital storage unit comprising a laminated structure including a sheet of insulating material; spaced pairs of input and output terminals thereon, a plurality of conductive strips fixed to the sheet in mutually spaced relation and coupled with said terminals and comprising flat ribbon-like conductors forming reactances having magnitudes as measured at said terminals which depend upon physical properties of the strips such as effective areas, pattern shapes and/or mutual relative orientations; and means for varying the magnitudes of the reactances by varying the effective areas, shapes and/or orientations of some of the conductors by physically adding reactance affecting material to, or subtracting material from the unit structure.

17. In a unit as set forth in claim 16, said patterns of conductive strips being arranged in plural separate paths all running across the sheet in one direction from input to output terminals and crossing a grid of spaced orthogonal indicia lines forming a numerical progression, the reactances formed by the conductive strips having preselected reactance values when their areas and positions are adjusted to physical limits defined by the lines of said grid.

18. In a unit as set forth in claim 16, said patterns of conductive strips being arranged in plural separate paths and comprising capacitive reactances including separate overlapping strips in each path connected respectively with an input and an output terminal, and a dielectric sheet interposed therebetween, the area of overlap of the strips being varied to change the capacity of the path.

19. In a unit as set forth in claim 18, one of the strips of each path being divided into a plurality of spaced islands of predetermined area, and conductor means for joining several of said islands together to provide the desired capacity.

20. In a unit as set forth in claim 18, one of said strips of each path being divided into a plurality of spaced islands of predetermined area overlapping the other strip, and a conductor offset from the other strip and joining said islands, the capacity of each path being adjusted by severing the conductor between islands.

21. In a unit as set forth in claim 16, said conductive strips being arranged in plural separate paths and including in each path a conductive zig-zag inductance strip connected between input and output terminals; and adjustment strip means overlapping a portion of each zig-zag inductance to fix its reactance according to the length of the overlap in that path.

22. In a unit as set forth in claim 21, said adjustment strip means comprising a powdered iron core material applied to the zig-zag strip in insulating relation therewith.

23. In a unit as set forth in claim 21, said adjustment strip comprising a strip of conductive material overlapping and shortcircuiting part of the length of said zig-zag strip.

References Cited by the Examiner

UNITED STATES PATENTS 2,903,633 9/59 Cother ............... 317—101

MALCOLM A. MORRISON, *Primary Examiner.*

ROBERT C. BAILEY, *Examiner.*